(12) United States Patent
Yang et al.

(10) Patent No.: US 11,277,804 B2
(45) Date of Patent: Mar. 15, 2022

(54) METHOD AND DEVICE FOR WIRELESS SIGNAL TRANSMISSION OR RECEPTION IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/638,433

(22) PCT Filed: Aug. 13, 2018

(86) PCT No.: PCT/KR2018/009286
§ 371 (c)(1),
(2) Date: Feb. 11, 2020

(87) PCT Pub. No.: WO2019/031951
PCT Pub. Date: Feb. 14, 2019

(65) Prior Publication Data
US 2020/0205088 A1 Jun. 25, 2020

Related U.S. Application Data

(60) Provisional application No. 62/586,874, filed on Nov. 15, 2017, provisional application No. 62/555,701, (Continued)

(51) Int. Cl.
*H04W 52/32* (2009.01)
*H04W 16/28* (2009.01)
(Continued)

(52) U.S. Cl.
CPC ......... *H04W 52/325* (2013.01); *H04W 16/28* (2013.01); *H04W 52/146* (2013.01); *H04W 52/42* (2013.01)

(58) Field of Classification Search
CPC ..... H04L 1/0001; H04L 5/003; H04L 5/0048; H04L 5/005; H04L 5/14; H04L 5/146;
(Continued)

(56) References Cited

U.S. PATENT DOCUMENTS

2013/0195084 A1* 8/2013 Chen ............... H04L 5/0048
370/336
2013/0215811 A1* 8/2013 Takaoka ........... H04W 28/0268
370/311

(Continued)

OTHER PUBLICATIONS

Huawei, HiSilicon, "Handling collisions of sTTI/TTI in UL", R1-1701741, 3GPP TSG RAN WG1 Meeting #88, Athens, Greece Feb. 13-17, 2017, 9 pages.
(Continued)

*Primary Examiner* — Ankur Jain
(74) *Attorney, Agent, or Firm* — Fish & Richardson P.C.

(57) ABSTRACT

The present invention relates to a wireless communication system and, specifically, to a method and a device therefor, the method comprising the steps of: transmitting a physical signal via one or more symbols; and performing a procedure for transmitting an SRS through each symbol over a plurality of symbols for beam alignment with a base station, wherein when the physical signal and the SRS overlap in a time domain and the physical signal has a higher priority than a priority of the SRS, an SRS transmission power of each symbol is equally reduced in all the plurality of symbols.

12 Claims, 11 Drawing Sheets

Related U.S. Application Data filed on Sep. 8, 2017, provisional application No. 62/543,974, filed on Aug. 11, 2017.

(51) Int. Cl.
*H04W 52/14* (2009.01)
*H04W 52/42* (2009.01)

(58) Field of Classification Search
CPC ............. H04W 16/28; H04W 28/0268; H04W 52/146; H04W 52/281; H04W 52/30; H04W 52/325; H04W 52/34; H04W 52/346; H04W 52/367; H04W 52/42; H04W 72/0406; H04W 72/0413; H04W 72/10; H04W 88/08; H04W 52/32; H04W 72/12; H04W 72/1242; H04W 72/1268
See application file for complete search history.

(56) References Cited

U.S. PATENT DOCUMENTS

| | | | | |
|---|---|---|---|---|
| 2013/0279433 | A1* | 10/2013 | Dinan | H04J 11/00 |
| | | | | 370/329 |
| 2014/0105141 | A1* | 4/2014 | Noh | H04L 5/0058 |
| | | | | 370/329 |
| 2014/0219199 | A1* | 8/2014 | Ji | H04W 88/08 |
| | | | | 370/329 |
| 2015/0230191 | A1* | 8/2015 | Seo | H04W 72/0413 |
| | | | | 370/329 |
| 2016/0081043 | A1* | 3/2016 | Seo | H04L 5/003 |
| | | | | 370/329 |
| 2019/0081751 | A1* | 3/2019 | Miao | H04B 7/0413 |

OTHER PUBLICATIONS

Huawei, HiSilicon, "UL power control for short TTI", R1-1706999, 3GPP TSG RAN WG1 Meeting #89, Hangzhou, China, May 15-19, 2017, 5 pages.

LG Electronics, "Consideration on UL multiplexing with short NR-PUCCH", R1-1707647, 3GPP TSG RAN WG1 Meeting #89, Hangzhou, P.R. China May 15-19, 2017, 5 pages.

LG Electronics, "Discussion on UL beam management", R1-1707605, 3GPP TSG RAN WG1 Meeting #89, Hangzhou, China May 15-19, 2017, 6 pages.

Nokia, Alcatel-Lucent Shanghai Bell, "On collisions between sTTI and TTI transmissions in UL", R1-1708175, 3GPP TSG RAN WG1 Meeting #89, Hangzhou, P. R. China, May 15-19, 2017, 9 pages.

PCT International Search Report and Written Opinion in International Application No. PCT/KR2018/009286, dated Nov. 23, 2018, 10 pages.

* cited by examiner

METHOD AND DEVICE FOR WIRELESS SIGNAL TRANSMISSION OR RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2018/009286, filed on Aug. 13, 2018, which claims the benefit of U.S. Provisional Application No. 62/586,874, filed on Nov. 15, 2017, U.S. Provisional Application No. 62/555,701, filed on Sep. 8, 2017, and U.S. Provisional Application No. 62/543,974, filed on Aug. 11, 2017. The disclosures of the prior applications are incorporated by reference in their entirety.

TECHNICAL FIELD

The present disclosure relates to a wireless communication system, and more particularly, to a method and apparatus for transmitting/receiving a wireless signal. The wireless communication system includes a carrier aggregation (CA)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting a signal by a user equipment (UE) in a wireless communication system, including transmitting a physical signal across one or more symbols, and performing a process of transmitting a sound reference signal (SRS) in each of the plurality of symbols, for beam refinement with a base station (BS). When the physical signal is overlapped with the SRS in a time domain and has a higher priority than the SRS, an SRS transmission power is decreased equally in each of the plurality of symbols.

In another aspect of the present disclosure, provided is a UE in a wireless communication system, including a radio frequency (RF) module and a processor. The processor is configured to transmit a physical signal across one or more symbols and perform a process of transmitting an SRS in each of the plurality of symbols, for beam refinement with a BS, and when the physical signal is overlapped with the SRS in a time domain and has a higher priority than the SRS, an SRS transmission power is decreased equally in each of the plurality of symbols.

The SRS may have an identical or different transmission (TX) beam direction in each symbol.

When the physical signal is overlapped with the SRS in the time domain and has the higher priority than the SRS, the SRS may be dropped in all of the plurality of symbols.

When the physical signal is overlapped with the SRS in the time domain and has a lower priority than the SRS, the SRS transmission power may be maintained unchanged in each of the plurality of symbols.

When the physical signal includes information about a TX beam from the BS, the physical signal may have the higher priority than the SRS.

When the physical signal includes at least acknowledgement/negative acknowledgement (ACK/NACK) information or scheduling request (SR) information, the physical signal may have the higher priority than the SRS.

When the physical signal includes only channel state information (CS), the physical signal may have a lower priority than the SRS.

The wireless communication system may include a $3^{rd}$ generation partnership project (3GPP)-based wireless communication system.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
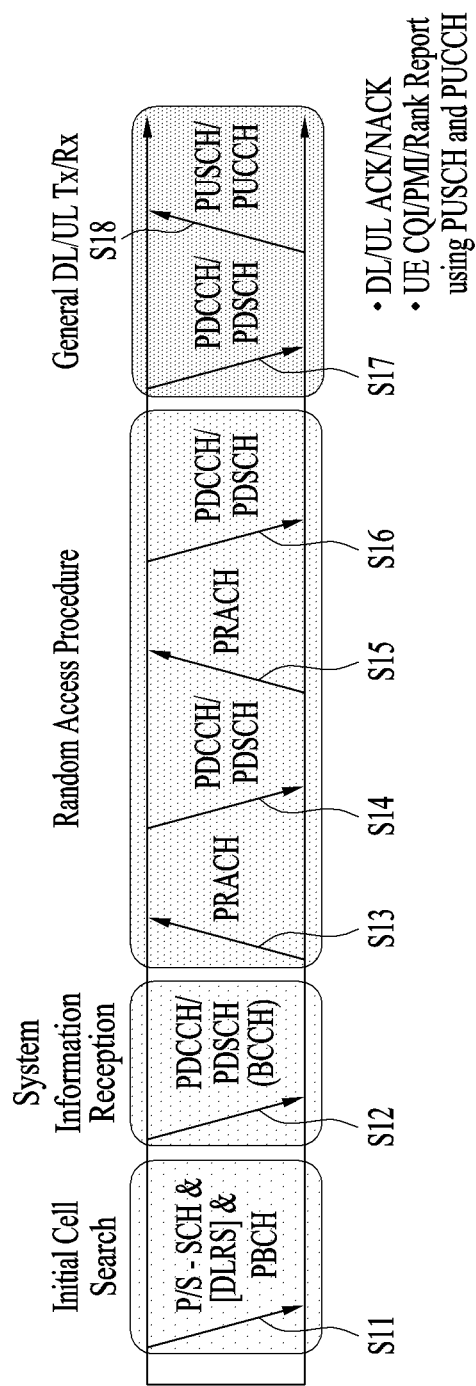
FIG. 1 illustrates physical channels used in $3^{rd}$ generation partnership project (3GPP) long term evolution(-advanced) (LTE(-A)) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
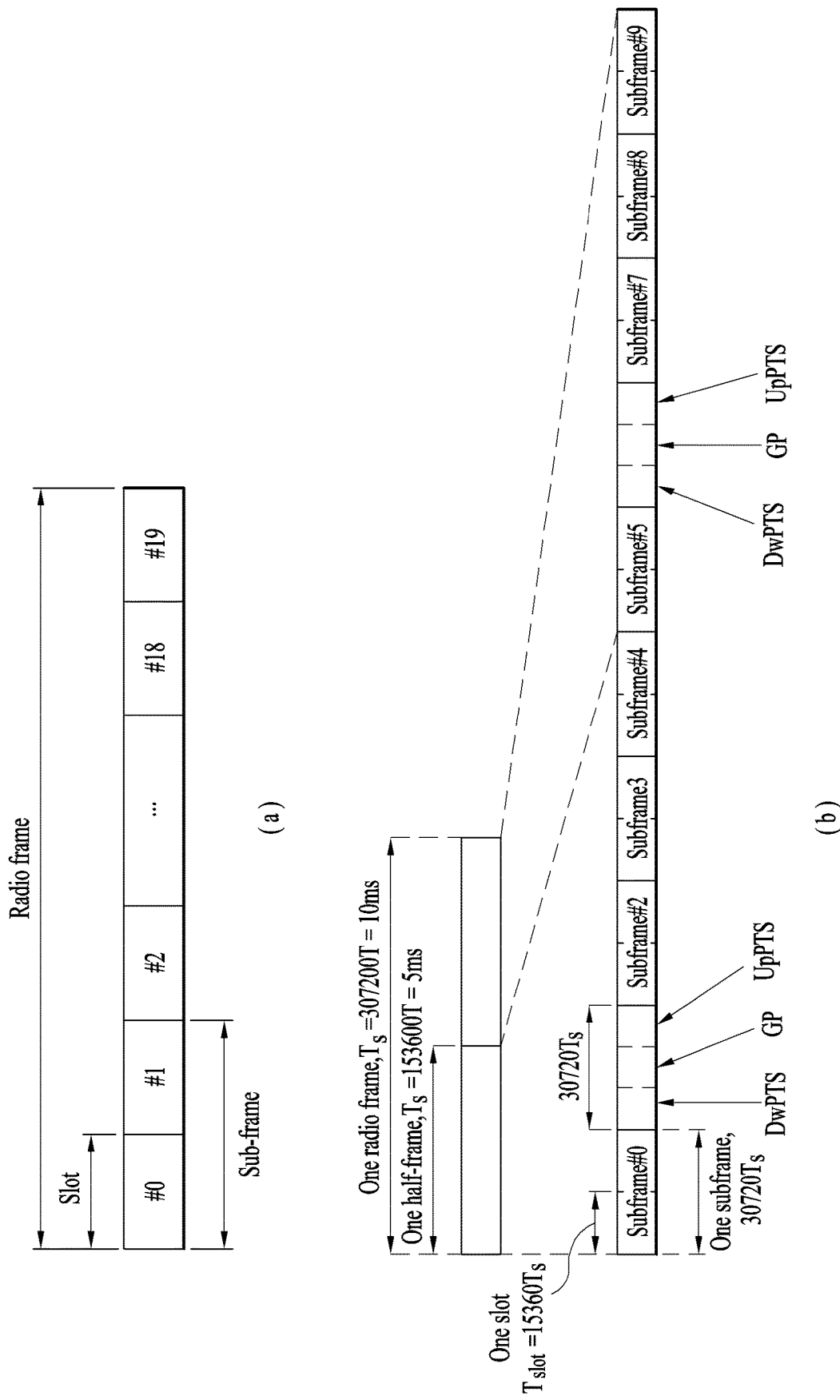
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
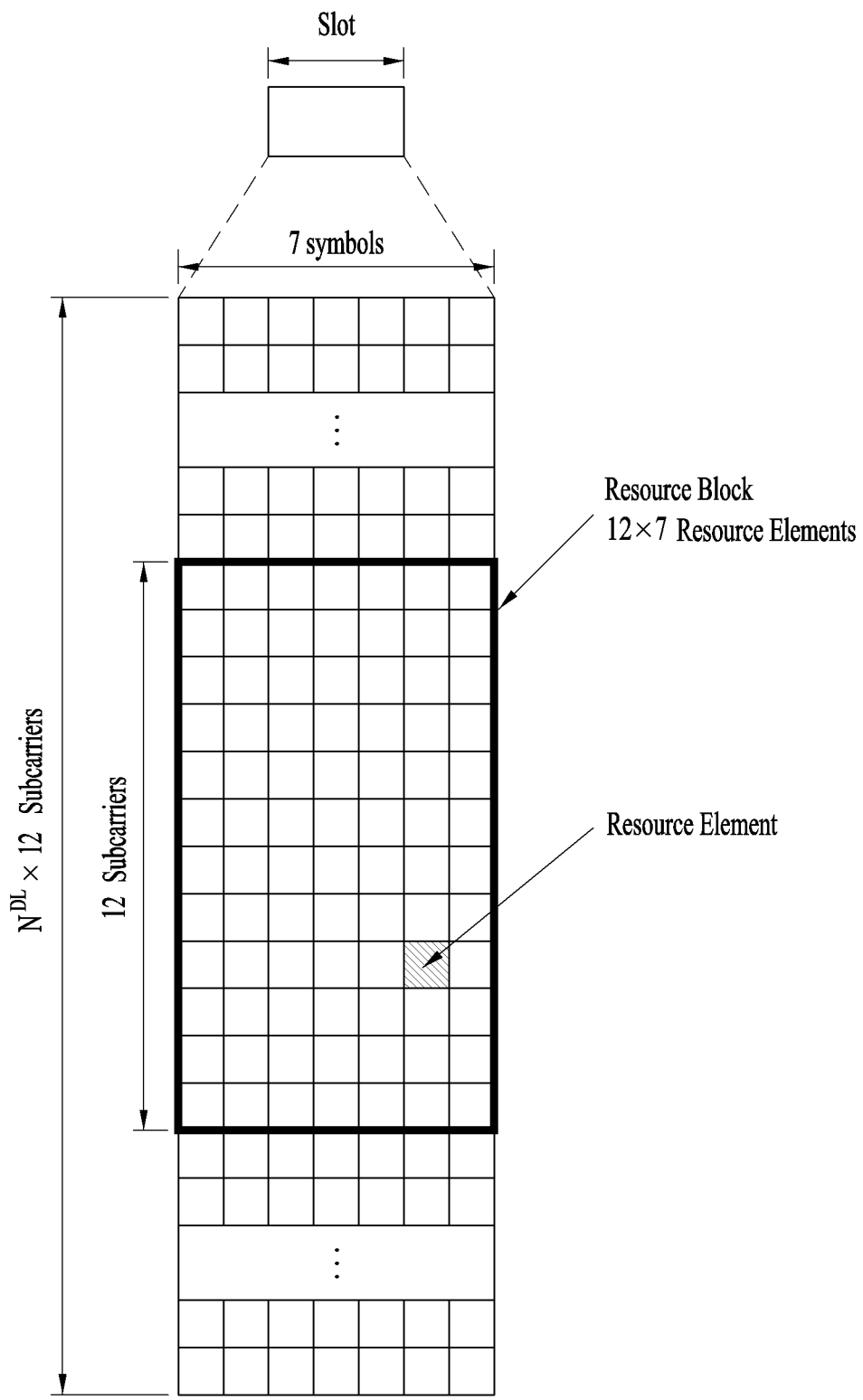
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
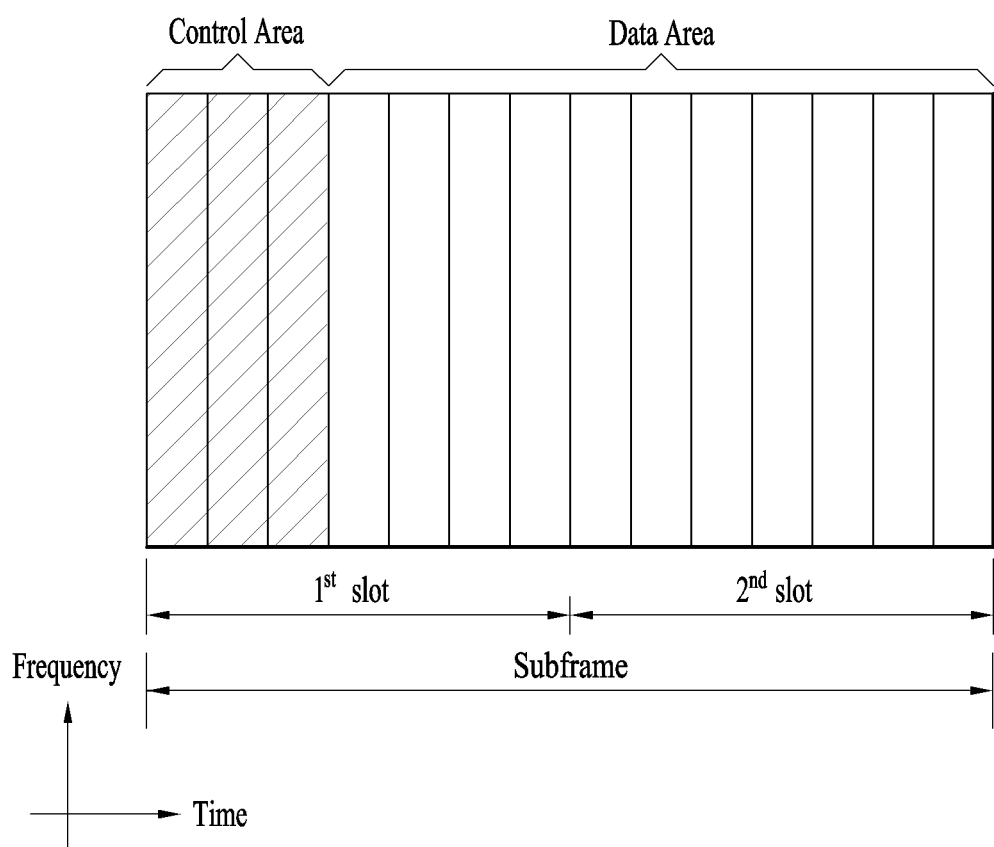
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |

TABLE 2-continued

| PDCCH format | Number of CCEs (n) | Number of REGs | Number of PDCCH bits |
|---|---|---|---|
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission
DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates a structure of an uplink subframe used in LTE(-A).

Figure 5:
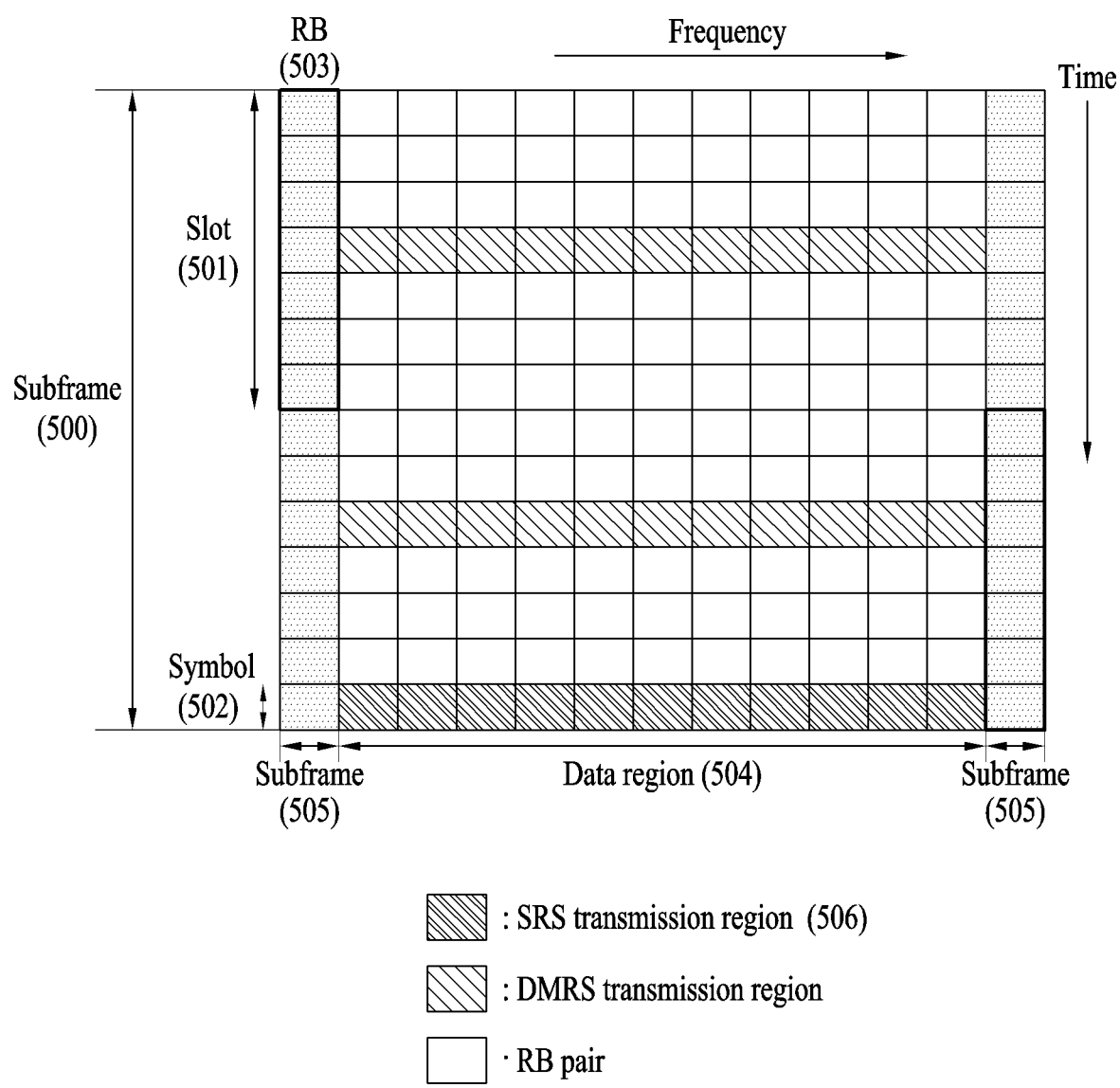
FIG. 5 illustrates the structure of an uplink subframe used in LTE(-A)

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
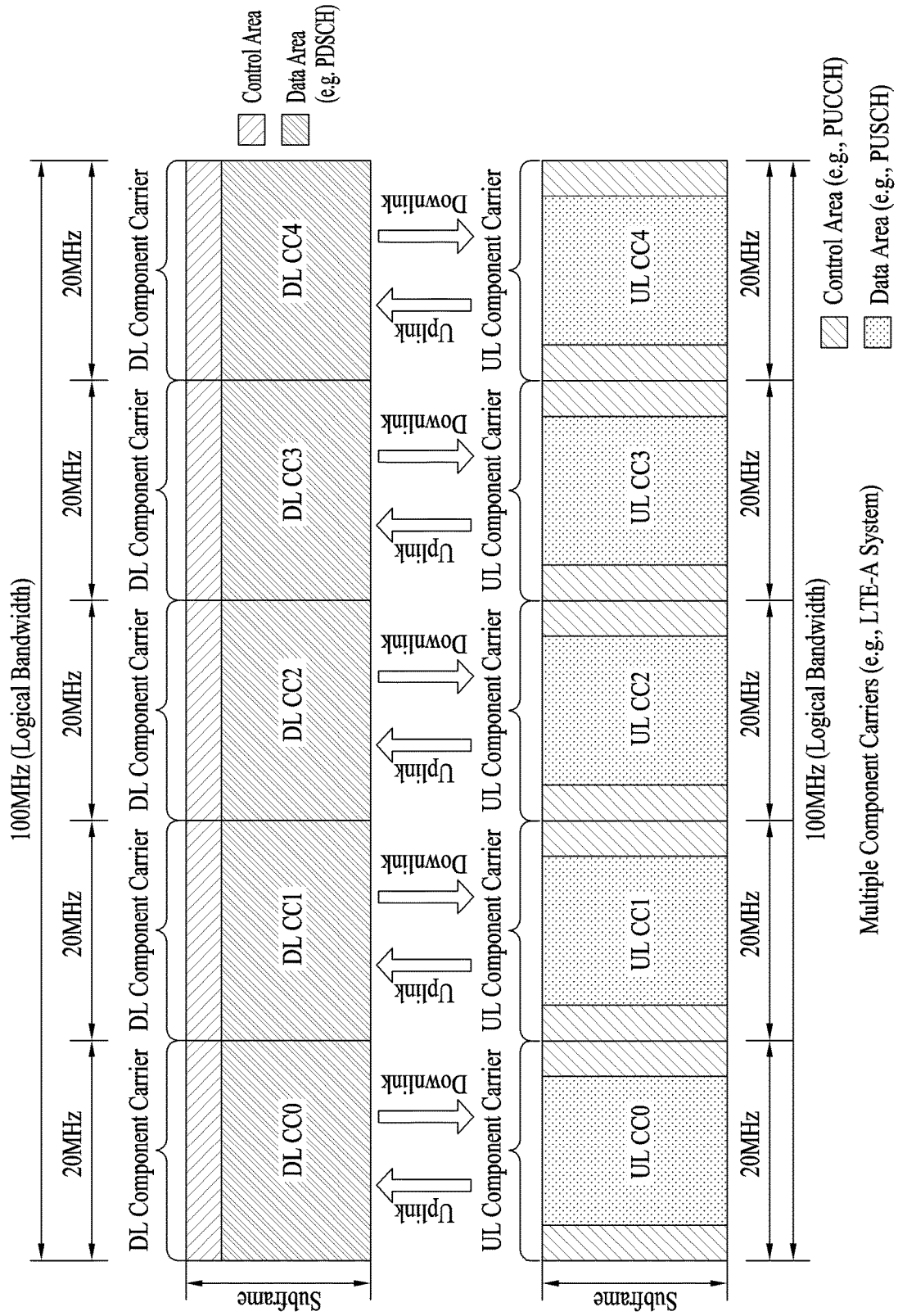
FIG. 6 illustrates a carrier aggregation (CA)-based wireless communication system.

FIG. 6 illustrates carrier aggregation (CA) communication system.

Referring to FIG. 6, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource in the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 7:
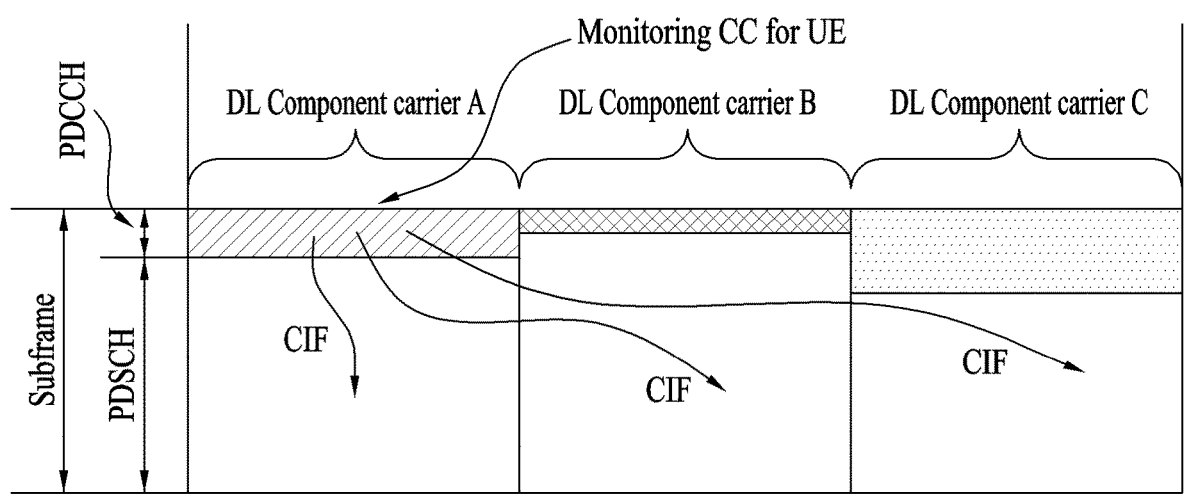
FIG. 7 illustrates cross-carrier scheduling.

FIG. 7 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 8:
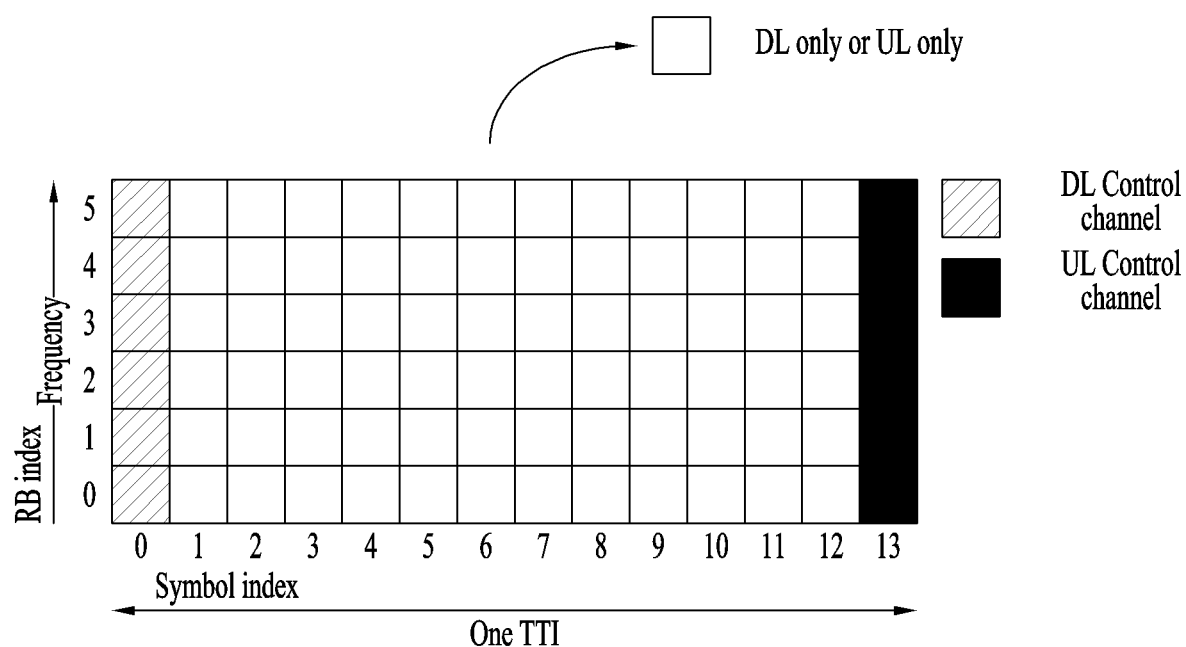
FIG. 8 illustrates a structure of a self-contained subframe.

In next-generation RAT (Radio Access Technology), a self-contained subframe is considered in order to minimize data transmission latency. FIG. 8 illustrates a self-contained subframe structure. In FIG. 8, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period
DL control period+DL data period
DL control period+GP+UL data period+UL control period
DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiments: Multiple UCI Combination Handling

In 3GPP New RAT (NR) system environment, it may be able to differently configure OFDM numerology (e.g., sub-carrier spacing and OFDM symbol duration based on the subcarrier spacing) among a plurality of cells carrier aggregated on a signal UE. Hence, (absolute time) duration of a time resource configured by the same number of symbols (e.g., an SF, a slot, or a TTI (for clarity, commonly referred to as TU (Time Unit)) can be differently configured between CA cells. In this case, a symbol can include an OFDM symbol and an SC-FDMA symbol.

Figure 9:
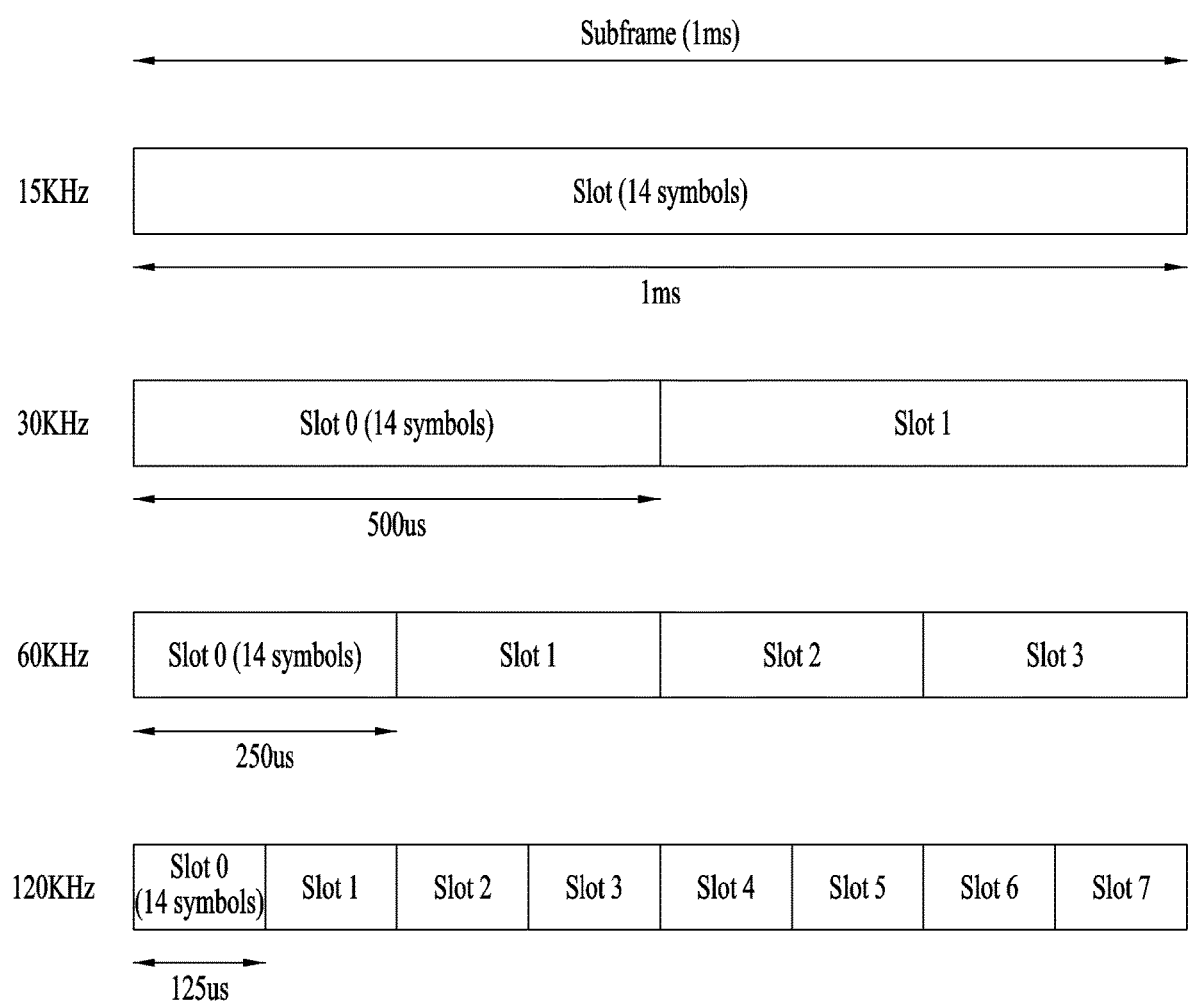
FIG. 9 illustrates a frame structure defined in 3GPP new RAT (NR)

FIG. 9 illustrates a frame structure defined in 3GPP NR. Similar to a radio frame structure of LTE/LTE-A (refer to FIG. 2), in 3GPP NR, a radio frame includes 10 subframes and each of the subframes has a length of 1 ms. A subframe includes one or more slots and a slot length varies depending on an SCS. 3GPP NR supports SCS of 15 KHz, 30 KHz, 60 KHz, 120 KHz, and 240 KHz. In this case, a slot corresponds to a TTI shown in FIG. 8.

Table 4 illustrates a case that the number of symbols per slot, the number of slots per frame, and the number of slots per subframe vary according to an SCS.

TABLE 4

| SCS ($15*2^u$) | Number of symbols within slot | Number of slot within frame | Number of slot within subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

In consideration of this, when CA is performed on cells having a different SCS and OS duration, it may consider an operation method described in the following for a DL/UL data-related HARQ procedure (e.g., when DL/UL data transmission in an Scell is cross-CC scheduled from a Pcell, A/N feedback is transmitted via the Pcell in response to DL data received in the Scell.) When CA is performed on cells having the same SCS and OS duration, although TU (e.g., slot) duration is differently configured between the cells, the same principle can be applied.

In the following, the present disclosure is explained centering on a case that a TU corresponds to a slot with reference to a frame structure of NR. The TU can be defined by various time resource units depending on a system. In the following description, a Pcell can be generalized by a cell configured to transmit a PUCCH (hereinafter, a PUCCH cell). For example, the PUCCH cell may include a specific Scell (e.g., Primary Secondary Cell (PSCell) configured to transmit a PUCCH. And, a Scell in which data is transmitted/received is generalized by a data cell or a scheduled cell and a cell in which grant DCI is transmitted can be generalized by a control cell or a scheduling cell. And, a cell can be replaced with a CC (Component Carrier). DCI is transmitted via PDCCH, UL data is transmitted via PUSCH, and DL data can be transmitted via PDSCH.

In the legacy LTE system, when CA is configured between a plurality of CCs, transmissions of a plurality of different UL channels/signals may be scheduled/configured simultaneously (on a plurality of CCs) in the same subframe. In this case, a UE may perform a signal process for the combination of the plurality of UL channels/signals based on their predetermined protection priorities (priorities) according to a predetermined condition. For example, when transmissions of two UL channels are scheduled/configured in the same subframe, the UE may perform the following operations.

1) Case 1: Both of the UL channels are simultaneously transmitted in the subframe.

2) Case 2: UCI (e.g., an HARQ-ACK (i.e., A/N), an SR, and CSI) configured in the two UL channels (e.g., PUCCHs) is jointly encoded and transmitted in one of the two UL channels.

3) Case 3: When the two UL channels are overlapped with each other over time-frequency resources or when the two UL channels are allocated to the same OFDM symbol, overlapped with each other in the time domain, one of the two UL channels is not mapped to the overlapped resources/symbol (through puncturing or rate-matching).

4) Case 4: One of the two UL channels is transmitted, while transmission of the other UL channel is skipped (dropped), according to their predetermined priorities.

5) Case 5: When the sum of powers set for the two UL channels is greater than a maximum transmission power of the UE (power-limited case), the power of one of the two UL channels is first decreased according to the priorities of the UL channels.

UL channels/signals may be prioritized in the order of PRACH>PUCCH>PUSCH with UCI>PUSCH without UCI>SRS, whereas UCI may be prioritized in the order of HARQ-ACK/SR>aperiodic CSI>aperiodic SRS>periodic CSI>periodic SRS. The PUSCH with UCI is a PUSCH to which UCI is piggybacked, and the PUSCH without UCI is a PUSCH to which UCI is not piggybacked. For the convenience, aperiodic CSI, aperiodic SRS, periodic CSI, and periodic SRS are referred to as a-CSI, a-SRS, p-CSI, and p-SRS, respectively.

In the NR system, the introduction of the following features is under consideration to support various operating frequency bands and use resources flexibly and efficiently.

1) Both of a long PUCCH type (e.g., PUCCH format 1/3/4) including a predetermined number of or more symbols (e.g., 4 or more symbols) and a short PUCCH type (e.g., PUCCH format 0/2) including fewer symbols than the predetermined number (e.g., 1 or 2 symbols) are supported in consideration of a different UL coverage level and/or a different UCI payload size for each UE.

Table 5 describes an exemplary relationship between PUCCH formats and UCI.

TABLE 5

| Format | PUCCH length in OFDM symbols | Number of bits | UCI | Etc. |
| --- | --- | --- | --- | --- |
| 0 | 1-2 | =2 | HARQ, SR | Sequence selection |
| 1 | 4-14 | =2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [=N] | HARQ, CSI, [SR] | DFT-s-OFDM(Pre DFT OCC) |

2) Transmission of a short PUCCH and another UL channel/signal (e.g., long PUCCH, PUSCH, or SRS) in TDM in the same slot is supported. 3) Transmission of a plurality of short PUCCHs in TDM in the same slot is supported.

4) Configuration of a different subcarrier spacing (SC) and/or a different TTI length for each of aggregated CCs for one UE in CA is supported.

5) Application of one of cyclic prefix OFDM (CP-OFDM) and DFT-spread-OFDM (DFT-s-OFDM) to transmission of a specific UL channel/signal (e.g., PUSCH) is supported. CP-OFDM and DFT-s-OFDM correspond to OFDM and SC-FDMA, respectively.

In the NR system, the introduction of the following types of UCI and SRS is further under consideration for the environment of a flexible UL/DL resource configuration-based TDD operation and an analog/hybrid beamforming transmission-based multi-beam operation.

1) Semi-persistent CSI (sp-CSI) reporting

A. With a CSI reporting period preconfigured by higher-layer signaling (RRC signaling), upon receipt of an L1 signaling (e.g., PDCCH)-based activation signal, the UE may transmit a CSI report in the CSI reporting period from the reception time of the activation signal. Then, upon receipt of an L1 signaling-based release signal, the UE may discontinue the CSI report transmission from the reception time of the release signal.

B. An sp-CSI report may be transmitted on a specific channel (e.g., PUCCH).

2) Semi-persistent SRS (sp-SRS) transmission

A. With an SRS transmission period preconfigured by higher-layer signaling (RRC signaling), upon receipt of an L1 signaling (e.g., PDCCH)-based activation signal, the UE may transmit an SRS signal in the SRS transmission period from the reception time of the activation signal. Then, upon receipt of an L1 signaling-based release signal, the UE may discontinue the SRS signal transmission from the reception time of the release signal.

3) Beam-refinement SRS (beam-SRS) transmission

A. In a multi-beam-based operation, the quality of a signal received in an operating transmission (TX)/reception (RX) beam pair (for UL and/or DL) between the UE and the eNB may be degraded in view of a radio channel state change (e.g., blockage). In this case, the operating beams may be updated by transmitting and receiving a plurality of SRSs between the UE and the eNB for a predetermined time (while changing TX beams and/or RX beams).

B. It may be configured that a plurality of beam-SRSs are transmitted over a plurality of (consecutive) OFDM symbols in one slot.

4) Beam-recovery SR (beam-SR) transmission

A. In a multi-beam-based operation, the received signal quality of a DL TX beam from the eNB (and/or a DL RX beam at the UE) may be degraded in view of a channel state change. In this case, the UE may report, through a specific signal/channel (e.g., PUCCH), the received signal quality of a current DL TX beam (configured as an operating beam) (report that the received quality is equal to or lower than a predetermined level) or its preferred DL TX beam (e.g., having the best reception quality) (among a plurality of DL TX beams from the eNB). That is, a beam-SR corresponds to control information/signal used to report information about the (preferred/received) DL TX beam.

B. A beam-SR may be transmitted on a specific channel (e.g., PUCCH) without any linkage to a DL TX beam, or a specific resource for beam-SR transmission may be configured on a DL TX beam basis. For example, a beam-SR may be multiplexed in FDM with a PRACH resource corresponding to each DL TX beam.

Now, methods of performing a signal process for a combination of a plurality of different UL channels/signals scheduled/configured in one slot in the NR system are proposed below. The present disclosure is applicable to a situation in which CA is configured between a plurality of CCs (or cells).

Before describing the proposed methods, a set of CCs (or cells) to which one timing advance (TA) is commonly applied is defined as a TA group (TAG). CCs configured for one UE may be set as a single-TAG or a multi-TAG according to cell deployment or the location of the UE. While the present disclosure will be described mainly in the context of a combination of UL channels/signals in different CCs (or cells), this should not be construed as limiting. The proposed methods of the present disclosure may also be applied in the same manner to a combination of a plurality of UL channels/signals (configured/indicated for transmission in a plurality of different parts of the bandwidth (BW) of a CC) in the same CC (or cell).

Hereinbelow, a symbol may be an OFDM symbol (e.g., CP-OFDM symbol or DFT-s-OFDM symbol). For example, a PUSCH/PUCCH symbol may be an OFDM symbol (e.g., CP-OFDM symbol or DFT-s-OFDM symbol) used to transmit a PUSCH/PUCCH.

[1] Part 1—Handling on Multiple UL Channel/Signal Combination (1) Combination 1: short PUCCH in CC1+PUSCH (or long PUCCH) in CC2

This may correspond to a case in which short PUCCH resources in CC1 and PUSCH (or long PUCCH) resources in CC2 are overlapped with each other at the same time point in the time domain. In this case, the UE may perform the following operations.

1) Opt 1: The short PUCCH and the PUSCH (or long PUCCH) are transmitted simultaneously.

A. Opt 1 may be applied to a multi-TAG and non-power-limited case.

2) Opt 2: The PUSCH (or long PUCCH) signal is not mapped to an overlapped symbol (through puncturing). That is, the short PUCCH may be fully transmitted, while the PUSCH (or long PUCCH) signal except for the overlapped part may be transmitted.

A. Opt 2 may be applied to a single-TAG case and/or a (multi-TAG and) power-limited case.

B. When the SCS of the PUSCH is larger than the SCS of the short PUCCH, a plurality of PUSCH symbols overlapped with the short PUCCH signal may be punctured.

C. When the short PUCCH is overlapped with a plurality of PUSCHs, all of the PUSCHs may be punctured. Alternatively, the PUSCHs may be punctured sequentially, one each time in a predetermined order until the sum of readjusted transmission powers becomes equal to or less than a maximum transmission power of the UE. The predetermined order may be based on a CC/cell index order.

D. When CP-OFDM is applied to the PUSCH, puncturing may be performed at an RE (group) level, not at a symbol level (until the sum of readjusted transmission powers becomes equal to or less than the maximum transmission power of the UE). For example, RE groups may be punctured sequentially, one each time until the sum of readjusted transmission powers becomes equal to or less than the maximum transmission power of the UE. For example, the RE groups may be punctured sequentially in an order of RE indexes or such that parity bits are punctured with priority (over systematic bits).

3) Opt 3: The transmission power of the PUSCH (long PUCCH) signal is reduced in all symbols or an overlapped symbol.

A. Opt 3 may be applied to a power-limited case (with quadrature phase shift keying (QPSK) applied to the PUSCH).

B. When the SCS of the PUSCH is larger than the SCS of the short PUCCH, the signal transmission power may be reduced in a plurality of PUSCH symbols overlapped with the short PUCCH.

C. When the short PUCCH is overlapped with a DMRS of the PUSCH, the signal transmission power of the whole PUSCH may be reduced. When the short PUCCH is not overlapped with the PUSCH DMRS, the signal transmission power of the PUSCH may be reduced in the overlapped symbol, or Opt 2 for Combination 1 may be applied.

(2) Combination 2: SRS in CC1+PUSCH (or PUCCH) in CC2

This may correspond to a case in which SRS resources in CC1 and PUSCH (or PUCCH) resources in CC2 are overlapped with each other at the same time point in the time domain. In this case, the UE may perform the following operations.

1) Opt 1: The SRS and the PUSCH (or PUCCH) are transmitted simultaneously.

A. Opt 1 may be applied to a multi-TAG and non-power-limited case.

2) Opt 2: The PUSCH (or PUCCH) signal is not mapped to an overlapped symbol through rate-matching.

A. Opt 2 may be applied to a single-TAG case.

B. When the type of the SRS is beam-SRS, Opt 2 may be applied.

C. When the SCS of the PUSCH is larger than the SCS of the SRS, a plurality of PUSCH symbols overlapped with the SRS signal may be rate-matched.

3) Opt 3: The PUSCH (or PUCCH) signal is not mapped to an overlapped symbol through puncturing.

A. Opt 3 may be applied to a single-TAG case and/or a (multi-TAG and) power-limited case.

B. When the type of the SRS is sp-SRS (or beam-SRS), Opt 3 may be applied.

C. When the SCS of the PUSCH is larger than the SCS of the SRS, a plurality of PUSCH symbols overlapped with the SRS signal may be punctured.

D. When the SRS is overlapped with a plurality of PUSCHs, all of the PUSCHs may be punctured. Alternatively, the PUSCHs may be punctured sequentially, one each time in a predetermined order until the sum of readjusted transmission powers becomes equal to or less than a maximum transmission power of the UE. The predetermined order may be based on a CC/cell index order.

E. When CP-OFDM is applied to the PUSCH, puncturing may be performed at an RE (group) level, not at a symbol level (until the sum of readjusted transmission powers becomes equal to or less than the maximum transmission power of the UE). For example, RE groups may be punctured sequentially, one each time until the sum of readjusted transmission powers becomes equal to or less than the maximum transmission power of the UE. For example, the RE groups may be punctured sequentially in an order of RE indexes or such that parity bits are punctured with priority (over systematic bits).

4) Opt 4: The transmission power of the PUSCH (PUCCH) is reduced in all symbols or an overlapped symbol.

A. Opt 4 may be applied to a power-limited case (with QPSK applied to the PUSCH).

B. When the type of the SRS is beam-SRS (or sp-SRS), Opt 4 may be applied.

C. When the SCS of the PUSCH is larger than the SCS of the SRS, the signal transmission power of a plurality of PUSCH symbols overlapped with the SRS signal may be reduced.

D. When the SRS is overlapped with a DMRS of the PUSCH, the signal transmission power of the whole PUSCH may be reduced. When the SRS is not overlapped with the PUSCH DMRS, the PUSCH signal power may be reduced in the overlapped symbol, or Opt 3 for Combination 2 may be applied.

5) Opt 5: Only the PUSCH (or PUCCH) is transmitted, while the SRS transmission is dropped.

A. Opt 5 may be applied to a single-TAG case and/or a (multi-TAG and) power-limited case.

B. When the type of the SRS is p-SRS (or a-SRS), Opt 5 may be applied.

C. When the PUSCH (or PUCCH) is overlapped with a plurality of SRSs, all of the SRSs may be dropped. Alternatively, the SRSs may be dropped sequentially, one each time in a predetermined order until the sum of readjusted transmission powers becomes equal to or less than the maximum transmission power of the UE. The predetermined order may be based on a CC/cell index order.

(3) Combination 3: beam-SR in CC1+PUSCH (or PUCCH) in CC2

This may correspond to a case in which beam-SR transmission resources in CC1 and PUSCH (or PUCCH) resources in CC2 are overlapped with each other at the same time point in the time domain. In this case, the UE may perform the following operations. Additionally, the following operations may also be applied in the same manner, when the beam-SR transmission resources are replaced with a short PUCCH configured for a normal data-SR transmission or HARQ-ACK transmission, and the PUSCH is replaced with a PUSCH or a long PUCCH configured for transmission of a UCI type (e.g., HARQ-ACK or CSI) other than an SR.

1) Opt 1: The beam-SR and the PUSCH (or PUCCH) are transmitted simultaneously.

A. Opt 1 may be applied to a multi-TAG and non-power-limited case.

2) Opt 2: The PUSCH (or PUCCH) signal is not mapped to an overlapped symbol through puncturing.

A. Opt 2 may be applied to a single-TAG case and/or a (multi-TAG and) power-limited case.

B. When the beam-SR resources are not overlapped with a DMRS of the PUSCH, Opt 2 may be applied. For example, when the beam-SR resources are overlapped with a symbol before the first DMRS symbol of the PUSCH or a symbol after the last DMRS symbol of the PUSCH, Opt 2 may be applied. In the former and latter cases, the following "consecutive puncturing" may be applied.

C. When the beam-SR resources are overlapped with some first symbols or some last symbols of the PUSCH (among symbols other than the DMRS), Opt 2 may be applied. In the former case (i.e., overlap with some first (or starting) symbols of the PUSCH), the first symbol to the overlapped symbols may be punctured, whereas in the latter case (i.e., overlap with some last (or ending) symbols of the PUSCH), the overlapped symbols to the last symbol may be punctured (this operation is referred to as "consecutive puncturing"), D. When the SCS of the PUSCH is larger than the SCS of the beam-SR, a plurality of PUSCH symbols overlapped with the beam-SR resources signal may be punctured.

E. When the beam-SR is overlapped with a plurality of PUSCHs, all of the PUSCHs may be punctured. Alternatively, the PUSCHs may be punctured sequentially, one each time in a predetermined order until the sum of readjusted transmission powers becomes equal to or less than a maximum transmission power of the UE. The predetermined order may be based on a CC/cell index order.

F. When CP-OFDM is applied to the PUSCH, puncturing may be performed at an RE (group) level, not at a symbol level (until the sum of readjusted transmission powers becomes equal to or less than the maximum transmission power of the UE). For example, RE groups may be punctured sequentially, one each time until the sum of readjusted transmission powers becomes equal to or less than the maximum transmission power of the UE. For example, the RE groups may be punctured sequentially in an order of RE indexes or such that parity bits are punctured with priority (over systematic bits).

3) Opt 3: The transmission power of the PUSCH (PUCCH) is reduced in all symbols or an overlapped symbol.

A. Opt 3 may be applied to a power-limited case (with QPSK applied to the PUSCH).

B. When the beam-SR resources are not overlapped with a DMRS of the PUSCH, Opt 3 may be applied. For example, when the beam-SR resources are overlapped with a symbol before the first DMRS symbol of the PUSCH or a symbol after the last DMRS symbol of the PUSCH, Opt 3 may be applied.

C. When the beam-SR resources are overlapped with some first symbols or some last symbols of the PUSCH (among symbols other than the DMRS), Opt 3 may be applied.

D. When the SCS of the PUSCH is larger than the SCS of the beam-SR, the signal transmission power of a plurality of PUSCH symbols overlapped with the beam-SR resources may be reduced.

E. When the beam-SR resources are overlapped with the DMRS of the PUSCH, the signal transmission power of the whole PUSCH may be reduced. When the beam-SR resources are not overlapped with the PUSCH DMRS, the PUSCH signal power may be reduced in the overlapped symbol, or Opt 2 for Combination 3 may be applied.

4) Opt 4: Only the beam-SR is transmitted, while the PUSCH (or PUCCH) transmission is dropped.

A. Opt 4 may be applied to a single-TAG case and/or a (multi-TAG and) power-limited case.

B. When the beam-SR resources are overlapped with the DMRS of the PUSCH, Opt 4 may be applied. For example, when the beam-SR resources are overlapped with any symbol between the first and last DMRS symbols of the PUSCH, Opt 4 may be applied.

C. When the beam-SR resources are overlapped with the remaining symbols except for first some symbols and last some symbols of the PUSCH (among symbols other than the DMRS), Opt 4 may be applied.

D. When the beam-SR is overlapped with a plurality of PUSCHs, all of the PUSCHs may be dropped. Alternatively, the PUSCHs may be dropped sequentially, one each time in a predetermined order until the sum of readjusted transmission powers becomes equal to or less than a maximum transmission power of the UE. The predetermined order may be based on a CC/cell index order.

[2] Part 2—Handling on Multiple UCI Combination (1) Case 1: Overlapping of PUCCH resource in time domain This may correspond to a case in which PUCCH resources configured (in the same slot) for a plurality of different UCIs are overlapped with each other in the same symbol. The UE may perform the following operations.

1) Opt 1: The plurality of UCIs are jointly encoded and transmitted in one PUCCH resource.

A. Opt 1 may be applied only to (i) a combination of a plurality of periodic UCIs and (ii) a combination of a single aperiodic UCI and a periodic UCI.

B. For a combination of a plurality of aperiodic UCIs (e.g., A/N and sp-CSI or A/N and a-CSI), only one UCI of a highest priority (e.g., A/N in a combination of A/N and sp-CSI) may be transmitted, while transmissions of the other UCIs may be dropped (Method 1).

2) Opt 2: The UCIs are simultaneously transmitted (in FDM) in PUCCH resources configured for the respective UCIs.

A. Opt 2 may also be applied to (i) a combination of a plurality of periodic UCIs, (ii) a combination of an aperiodic UCI and a periodic UCI, and (iii) a combination of a plurality of aperiodic UCIs.

B. When a UCI combination is given as {A/N+SR+CSI}, Alt 1) the SR and the A/N may be jointly encoded and transmitted on a PUCCH configured for the A/N (referred to as A/N PUCCH), while the CSI may be transmitted on a PUCCH configured for the CSI (referred to as CSI PUCCH), or Alt 2) the SR and the A/N may be jointly encoded and transmitted on the A/N PUCCH, while the SR and the CSI may be jointly encoded and transmitted on the CSI PUCCH.

C. In a power-limited case, only a UCI of a highest priority may be transmitted, while transmissions of the other UCIs may be dropped. Alternatively, the UCIs may be sequentially dropped, one each time or may be decreased in power according to priorities, until the sum of readjusted transmission powers becomes equal to or less than the maximum transmission power of the UE (Method 2).

(2) Case 2: Non-overlapping of PUCCH resource in time domain

This may correspond to a case in which PUCCH resources configured (in the same slot) for a plurality of different UCIs are not overlapped with each other in the same symbol in the time domain. Then, the UE may perform the following operations.

1) Opt 1: The UCIs are simultaneously transmitted (in TDM) in PUCCH resources configured for the respective UCIs.

A. Opt 1 may be considered in combination of Opt 1 of Case 1. Specifically, UCIs having PUCCH resources overlapped with each other in the time domain may be jointly encoded and mapped to one PUCCH. The plurality of PUCCHs which are not overlapped with each other in the time domain, including the PUCCH carrying the jointly encoded UCIs may be simultaneously transmitted in TDM.

B. A UCI combination may be given as {A/N+SR+CSI}, an A/N PUCCH resource and a CSI PUCCH resource may be allocated in TDM, and an SR PUCCH resource may be overlapped with one of the A/N PUCCH resource and the CSI PUCCH resource in the time domain. In this case, 1) Alt 1 or Alt 2 of Opt 2 in Case 1 may be applied, or 2) UCI 1 having a PUCCH resource overlapped with the SR PUCCH resource may be jointly encoded with the SR and transmitted on a PUCCH configured for UCI 1, while UCI 2 may be transmitted on a PUCCH configured for UCI 2.

[3] Part 3—Handling on Semi-Persistent UCI/SRS and Beam-Related UCI/SRS (1) Semi-Persistent CSI (Sp-CSI)

1) UCI RE mapping method in the case of UCI piggyback to PUSCH

A. A DCI indicating (e.g., activating) sp-CSI reporting may be different from a UL grant DCI scheduling a PUSCH. After the sp-CSI activation, a CSI report is transmitted periodically without an additional DCI indicating CSI reporting. Therefore, when the UE fails in detecting the DCI activating sp-CSI, there may be a mismatch regarding CSI reporting between the UE and the eNB.

B. When sp-CSI is piggybacked to the PUSCH, UCI RE mapping may be performed through puncturing (not rate-matching) in consideration of DCI missing.

2) Handing method in the case of time-domain overlap between (PUCCH resources of) A/N and/or SR A. In consideration of DCI missing, 1) the UCIs may be transmitted simultaneously (in FDM) in PUCCH resources configured for the respective UCIs by applying Opt 2 of Case 1 in Part 2 (without joint encoding), or 2) only a UCI of a higher priority (e.g., A/N or SR) may be transmitted, while transmissions of the other UCIs (e.g., sp-CSI) may be dropped, or the UCIs may be sequentially dropped, one each time or decreased in power according to the priorities of the UCIs, by applying Method 1 or Method 2 in Part 2 (in the power-limited case).

3) Method of configuring and activating sp-CSI reporting in a plurality of CCs in a CA situation.

A. A common sp-CSI reporting period may be configured for all of the plurality of CCs or an individual/independent (e.g., different) sp-CSI reporting period may be configured on a CC (group) basis. In the latter case, the same sp-CSI reporting period may be configured for the CCs of the same CC group.

B. For activation of sp-CSI reporting configured for the plurality of CCs, one DCI or a MAC signal may indicate a CC (group) among the plurality of CCs for which sp-CSI reporting is activated (e.g., by a bitmap) or indicate whether all of the plurality of CCs are activated.

(2) Semi-Persistent SRS (Sp-SRS)

1) Handling method in the case of overlap with PUSCH in time domain

A. sp-SRS (or a-SRS) transmission may have a higher priority than general p-SRS transmission or PUSCH transmission.

B. In consideration of these priorities, 1) the sp-SRS and the PUSCH may be transmitted simultaneously (in FDM) by applying Opt 1 for Combination 2 or 2) the PUSCH signal may be punctured or decreased in power (in a power-limited case) by applying Opt 3/4 for Combination 2 (without SRS dropping).

2) Method of configuring and activating sp-SRS for a plurality of CCs in a CA situation A. For the plurality of CCs, a common sp-SRS transmission period may be configured or an individual/independent (e.g., different) sp-SRS transmission period may be configured on a CC (group) basis. In the latter case, the same sp-SRS transmission period may be configured for the CCs of the same CC group.

B. For activation of sp-SRS transmission configured in the plurality of CCs, one DCI or MAC signal may indicate a CC (group) for which sp-SRS transmission is activated among the plurality of CCs (e.g., by a bitmap) or indicate whether all of the plurality of CCs are activated.

(3) Beam-Refinement SRS (Beam-SRS)

1) Handling method in the case of time-domain overlap with PUSCH (or PUCCH)

A. Because the beam-SRS is transmitted for the purpose of updating an operating beam to maintain transmission/reception quality, the beam-SRS transmission may have a higher priority than PUSCH transmission (and/or PUCCH transmission).

B. In consideration of the priorities, 1) the beam-SRS and the PUSCH (or PUCCH) may be transmitted simultaneously (in FDM) by applying Opt 1 for Combination 2, or 2) the PUSCH (or PUCCH) signal may be punctured or decreased in power (in a power-limited case) by applying Opt 3/4 for Combination 2 (without SRS dropping).

2) Handling method in the case of time-domain overlap with higher-priority channel/signal (e.g., a later-described priority signal)

A. For a plurality of beam-SRSs which are transmitted while TX/RX beams are changed, transmission power may have to be maintained equal throughout one beam refinement process, for accurate selection of a preferred beam.

B. Therefore, when the plurality of beam-SRSs are overlapped with a higher-priority channel/signal in the time domain (and/or in a power-limited case), 1) all of the plurality of beam-SRSs configured in one beam-refinement process may be dropped (e.g., by adjusting transmission power to 0) or 2) the transmission powers of the plurality of beam-SRSs may be reduced equally, in consideration of the above-described features.

Figure 10:
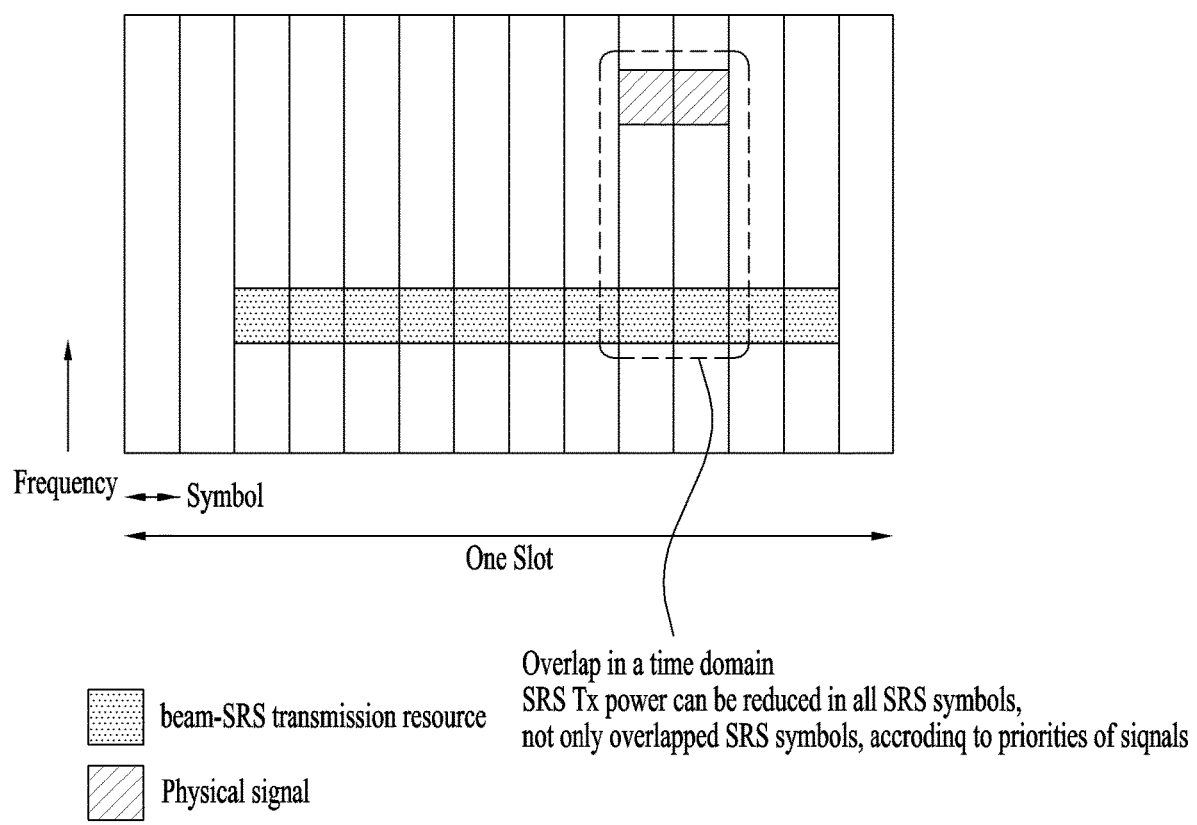
FIG. 10 illustrates signal transmission according to the present disclosure.

FIG. 10 illustrates exemplary signal transmission according to an example of the present disclosure. Referring to FIG. 10, the UE may transmit a physical signal across one or more symbols in a slot. Further, the UE may transmit an SRS (e.g., beam-SRS) in each of a plurality of symbols for beam refinement with the eNB. Each of the plurality of symbols includes an SRS transmission resource. When the physical signal is overlapped with the SRS in the time domain and has a higher priority than the SRS, a SRS transmission power may be reduced equally in each of the plurality of symbols. Further, when the physical signal is overlapped with the SRS in the time domain and has a higher priority than the SRS, the SRS may be dropped in all of the plurality of symbols (e.g., by adjusting its transmission power to 0). When the physical signal is overlapped with the SRS in the time domain and has a lower priority than the SRS, the SRS transmission power may be maintained unchanged in each of the plurality of symbols.

For example, when the physical signal includes reporting information about a TX beam of the eNB, the physical signal may have a higher priority than the SRS. Further, when the physical signal includes at least ACK/NACK information or SR information, the physical signal may have a higher priority than the SRS. Further, when the physical signal includes only CSI, the physical signal may have a lower priority than the SRS.

For the SRS, a TX beam direction may be identical or different in each symbol. Further, the wireless communication system may include a 3GPP-based wireless communication system.

3) Sharing of UL TX beam and/or DL RX beam between a plurality of CCs in a CA situation A. For a plurality of specific CCs in a CA situation, the same UL TX beam or DL RX beam (index or ID) may have excellent transmission/reception link quality according to the radio frequency (RF) implementation/features and frequency band/wireless channel features of the UE.

B. Therefore, the eNB may configure a CC group to which the same UL TX beam and/or the same DL RX beam may be applied out of the plurality of CCs aggregated in CA. According to this configuration, the UE may transmit/receive a UL/DL signal on the same UL TX beam and/or the same DL RX beam in the CCs of the CC group.

C. In another method, it may be configured that a UL signal is transmitted on the same UL TX beam in the CCs of a CC group (TAG) for which the same TA is configured.

(4) Beam-Recovery SR (Beam-SR)

1) Handling method in the case of time-domain overlap (of transmission resources) with A/N and/or SR and/or CSI A. Because the beam-SR is transmitted for the purpose of maintaining the received signal quality of a DL TX/RX beam, the beam-SR may have a higher priority than almost all the other channels/signals.

B. In consideration of the priorities, 1) the beam-SR and a UCI may be jointly encoded and transmitted in one PUCCH resource (e.g., a UCI PUCCH), with increased transmission power (e.g., higher than power configured for UCI transmission), 2) the beam-SR and each UCI may be transmitted simultaneously (in FDM) in PUCCH resources configured respectively for the beam-SR and the UCI by applying Opt 2 in Case 1 of Part 2 (without joint encoding), or 3) only the beam-SR (or a higher-priority UCI including the beam-SR) may be transmitted, while transmissions of the other UCIs may be dropped, or UCIs may be sequentially dropped or decreased in power according to their priorities, by applying Method 1 in Part 2 or Method 2 in Part 2 (in a power-limited case).

2) Prioritization between UCI including beam-SR and UL channel/signal

A. Prioritization of beam-SR, A/N, SR, beam-SRS, and other CSI/SRS

Opt 1: beam-SR>A/N=SR>beam-SRS>other CSI/SRS
  Opt 2: beam-SR>beam-SRS>A/N=SR>other CSI/SRS B. Prioritization between CSI and SRS Opt 1: a-CSI=sp-CSI>a-SRS=sp-SRS
  Opt 2: a-CSI>sp-CSI>a-SRS>sp-SRS
  Opt 3: a-CSI>a-SRS>sp-CSI>sp-SRS C. Prioritization of beam-SR, beam-SRS, and PUSCH Opt 1: beam-SR>PUSCH with UCI>beam-SRS>PUSCH w/o UCI
  Opt 2: beam-SR>beam-SRS>PUSCH (with or w/o UCI)

D. A channel/signal which is to be first dropped in transmission may be determined according to the above prioritizations in a (single-TAG and) non-power-limited case. A channel/signal which is to be first dropped in transmission or decreased in power may be determined according to the above prioritizations in a (multi-TAG and) power-limited case.

3) Prioritization in further consideration of beam-related RSRP reporting

A. In NR, an RSRP measurement (referred to as beam-RSRP) of a DL (TX) beam from the eNB may be reported on a physical channel (e.g., PUCCH). In this case, the beam-RSRP, other UCIs, and UL channels/signals may be prioritized as follows.

Opt 1: beam-SR>beam-RSRP>A/N=SR>beam-SRS>other CSI/SRS
Opt 2: beam-SR>beam-RSRP=A/N=SR>beam-SRS>other CSI/SRS
Opt 3: beam-SR>A/N=SR>beam-RSRP>beam-SRS>other CSI/SRS
Opt 4: beam-SR>A/N=SR>beam-RSRP=beam-SRS>other CSI/SRS
Opt 5: beam-SR>beam-RSRP>beam-SRS>A/N=SR>other CSI/SRS
Opt 6: beam-SR>beam-RSRP=beam-SRS>A/N=SR>other CSI/SRS A UCI transmitted on a PUCCH and/or a PUSCH may be encoded as follows in NR.

1) When the UCI has X or fewer bits (e.g., X=11), the following operation is performed.

A. Coded UCI bits are generated by applying coding scheme A (e.g., an RM code) without CRC addition.

2) When the UCI has more than X bits (e.g., X=11), the following operation is performed.

A. After a Y-bit CRC is added, coded UCI bits are generated by applying coding scheme B (e.g., a Polar code).

In this state, when transmissions of a UCI having X or fewer bits and a UCI having more than X bits are allowed in the same PUCCH format/resources, for example, a rapid increase in the number of input coded bits from X+1 bits due to CRC addition is likely to cause performance degradation. Therefore, for the same PUCCH format/resources, a different power offset may be configured/applied for PUCCH transmission power according to (i) the number of UCI bits (e.g., whether the number of UCI bits is X or less, or larger than X), (ii) a coding scheme used for UCI encoding (e.g., an RM code or a Polar code), and/or (iii) whether a CRC has been added.

The proposed methods of the present disclosure may be applied in a similar manner even when a UE operates at the same time in a plurality of subbands or switches between the subbands in a state where a single cell or carrier is divided into the plurality of subbands and a different SCS or TU is configured for each subband. In this case, a cell may be replaced with a subband (within a cell) in the present disclosure. Herein, a subband includes consecutive frequency resources (e.g., a plurality of consecutive RBs). A subband may be referred to as a bandwidth part (BWP).

Figure 11:
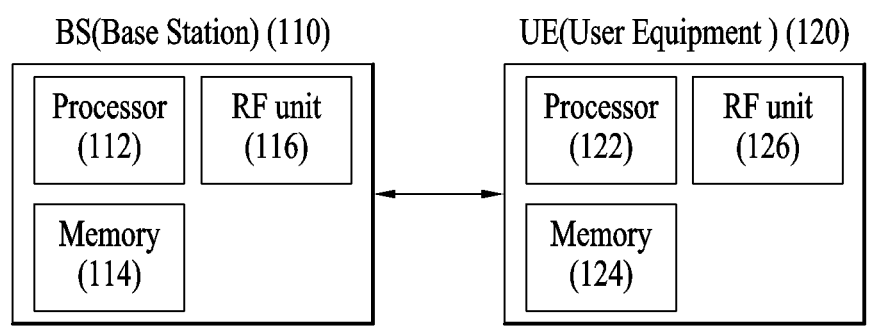
FIG. 11 illustrates a base station (BS) and a user equipment (UE) applicable to the present disclosure.

FIG. 11 illustrates a BS and a UE of a wireless communication system, which are applicable to embodiments of the present disclosure.

Referring to FIG. 11, the wireless communication system includes a BS 110 and a UE 120. When the wireless communication system includes a relay, the BS or UE may be replaced by the relay.

The BS 110 includes a processor 112, a memory 114 and an RF unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

What is claimed is:

1. A method of transmitting a signal by a user equipment (UE) in a wireless communication system, the method comprising:
    transmitting a physical signal in first symbols; and
    performing a process for transmitting sound reference signals (SRSs) across second symbols, wherein the SRSs are for refinement of one beamin a time domain with a base station (BS),
    based on the first symbols being partially overlapped with the second symbols in the time domain:
    based on the physical signal having a lower priority than the SRSs, decreasing a transmission power of the physical signal in all of the first symbols when a demodulation reference signal (DM-RS) for the physical signal is included in a partially overlapped symbol among the first symbols, and deceasing a transmission power of the physical signal only in the partially overlapped symbol when the DM-RS is not included in the partially overlapped symbol; and
    based on the physical signal having a higher priority than the SRSs, decreasing transmission powers of the SRSs equally in all of the second symbols including in a symbol not overlapped with the first symbols,
    wherein the SRSs have different transmission (TX) and reception (RX) beam directions in each symbol of the second symbols.

2. The method according to claim 1, wherein, based on the first symbols being partially overlapped with the second symbols in the time domain, and based on the physical signal having the higher priority than the SRS, the transmission powers of the SRSs are decreased to 0 in all of the second symbols including in the symbol not overlapped with the first symbols.

3. The method according to claim 1, wherein, based on the first symbols being partially overlapped with the second symbols in the time domain, based on the physical signal having the lower priority than the SRS, the transmission powers of the SRSs are maintained unchanged in the second symbols.

4. The method according to claim 1, wherein, based on the physical signal including information about a TX beam from the BS, the physical signal has the higher priority than the SRSs.

5. The method according to claim 1, wherein, based on the physical signal including one of acknowledgement/negative acknowledgement (ACK/NACK) information and scheduling request (SR) information, the physical signal has the higher priority than the SRSs.

6. The method according to claim 5, wherein, based on the physical signal including only channel state information (CSI), the physical signal has the lower priority than the SRSs.

7. A user equipment (UE) in a wireless communication system, the UE comprising:
    a radio frequency (RF) module; and
    a processor,
    wherein the processor is configured to:
    transmit a physical signal in first symbols; and
    perform a process for transmitting sound reference signals (SRSs) in across second symbols, wherein the SRSs are for refinement of one beam in a time domain with a base station (BS), and
    based on the first symbols of the plurality of symbols being partially overlapped with the second symbols in the time domain:
    based on the physical signal having a lower priority than the SRSs, decreasing a transmission power of the physical signal in all of the first symbols when a demodulation reference signal (DM-RS) for the physical signal is included in a partially overlapped symbol among the first symbols, and deceasing a transmission power of the physical signal only in the partially overlapped symbol when the DM-RS is not included in the partially overlapped symbol; and
    based on the physical signal having a higher priority than the SRSs, decreasing transmission powers of the SRSs are equally in all of the second symbols including in a symbol not overlapped with the first symbols,
    wherein the SRSs have different transmission (TX) and reception (RX) beam directions in each symbol of the second symbols.

8. The UE according to claim 7, wherein, based on the first symbols being partially overlapped with the second symbols in the time domain, and based on the physical signal having the higher priority than the SRS, the transmission powers of the SRSs are decreased to 0 in all of the second symbols including in the symbol not overlapped with the first symbols.

9. The UE according to claim 7, wherein, based on the first symbols being partially overlapped with the second symbols in the time domain, and based on the physical signal having the lower priority than the SRS, all of the transmission powers of the SRSs are maintained unchanged in the second symbols.

10. The UE according to claim 7, wherein, based on the physical signal including information about a TX beam from the BS, the physical signal has the higher priority than the SRSs.

11. The UE according to claim 7, wherein, based on the physical signal including one of acknowledgement/negative acknowledgement (ACK/NACK) information and scheduling request (SR) information, the physical signal has the higher priority than the SRSs.

12. The UE according to claim 11, wherein, based on the physical signal including only channel state information (CSI), the physical signal has the lower priority than the SRSs.

* * * * *